CONNECTING APPARATUS

Filed Aug. 23, 1957 3 Sheets-Sheet 1

INVENTORS
WARREN D. CURETON
FREDERICK DAVID FORD
DONALD L. HUEBSCH
ARNOLD M. SKUDRE

BY Christie, Parker & Hale
ATTORNEYS

Sept. 4, 1962 W. D. CURETON ETAL 3,052,767

CONNECTING APPARATUS

Filed Aug. 23, 1957 3 Sheets-Sheet 2

WARREN D. CURETON
FREDERICK DAVID FORD
DONALD L. HUEBSCH
ARNOLD M. SKUDRE
INVENTORS

BY

Christie, Parker & Hale
ATTORNEYS

CONNECTING APPARATUS

Filed Aug. 23, 1957

INVENTORS
WARREN D. CURETON
FREDERICK DAVID FORD
DONALD L. HUEBSCH
ARNOLD M. SKUDRE
BY
Christie, Parker & Hale
ATTORNEYS 3,052,767
Patented Sept. 4, 1962

3,052,767

CONNECTING APPARATUS

Warren D. Cureton, Garden Grove, Frederick David Ford, San Marino, Donald L. Huebsch, North Hollywood, and Arnold M. Skudre, Arcadia, Calif., assignors, by mesne assignments, to the United States of America as represented by the Secretary of the Army Filed Aug. 23, 1957, Ser. No. 679,883
2 Claims. (Cl. 200—46)

This invention relates to connecting circuit apparatus and more particularly to apparatus for providing circuit paths which may be changed with ease.

In many instances, circuits for interconnecting system units provide means for selectively changing the circuits between the units. Patch panels are frequently used for this purpose. Such patch panels usually employ input and output sections with the sections laid out end to end to form a panel. Manually positioned connectors or leads bridge the input and output sections to form the desired interconnecting paths. The leads used in a patch panel are usually unwieldy both in storage and in use. In an attempt to make the panel arrangement orderly, the leads are ordinarily of various lengths to bridge different distances between input and output section outlets. This complicates the storage problem and fails to alleviate the confusion of leads connecting inputs and outputs over the panel area. To provide access to the panel for selection, the connecting leads are placed in a prominent position and are therefore exposed to accidental or undesired changes in interconnecting paths. Further, the space required is disproportionate to its function, being only a step removed from "breadboard" arrangements.

The present invention overcomes these difficulties and affords additional advantages in connecting circuit apparatus. In accordance with the present invention a connecting circuit is provided by employing spaced and opposing horizontal and vertical grids and an intermediate programming or connector panel disposed between the opposing grids. Connectors for establishing interchange paths between grids are supported and selectively positioned at crosspoints of the grid conductors projected on the programming or connector panel. Openings in the connector panel at the projected crosspoints of the grids permit insertion and removal of the connectors at selected crosspoints for establishing the desired interconnecting paths.

The invention is explained in more detail with reference to the drawings, in which:

FIG. 1 illustrates four connecting circuit units 10, 10A, 10B and 10C. Any desired number of units may be employed.

Figure 1:
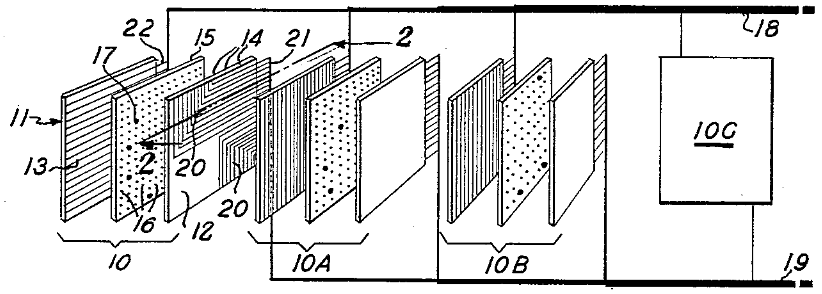
FIG. 1 is a diagrammatic view of a connecting circuit network arranged in accordance with the preferred embodiment of the present invention.
Figure 2:
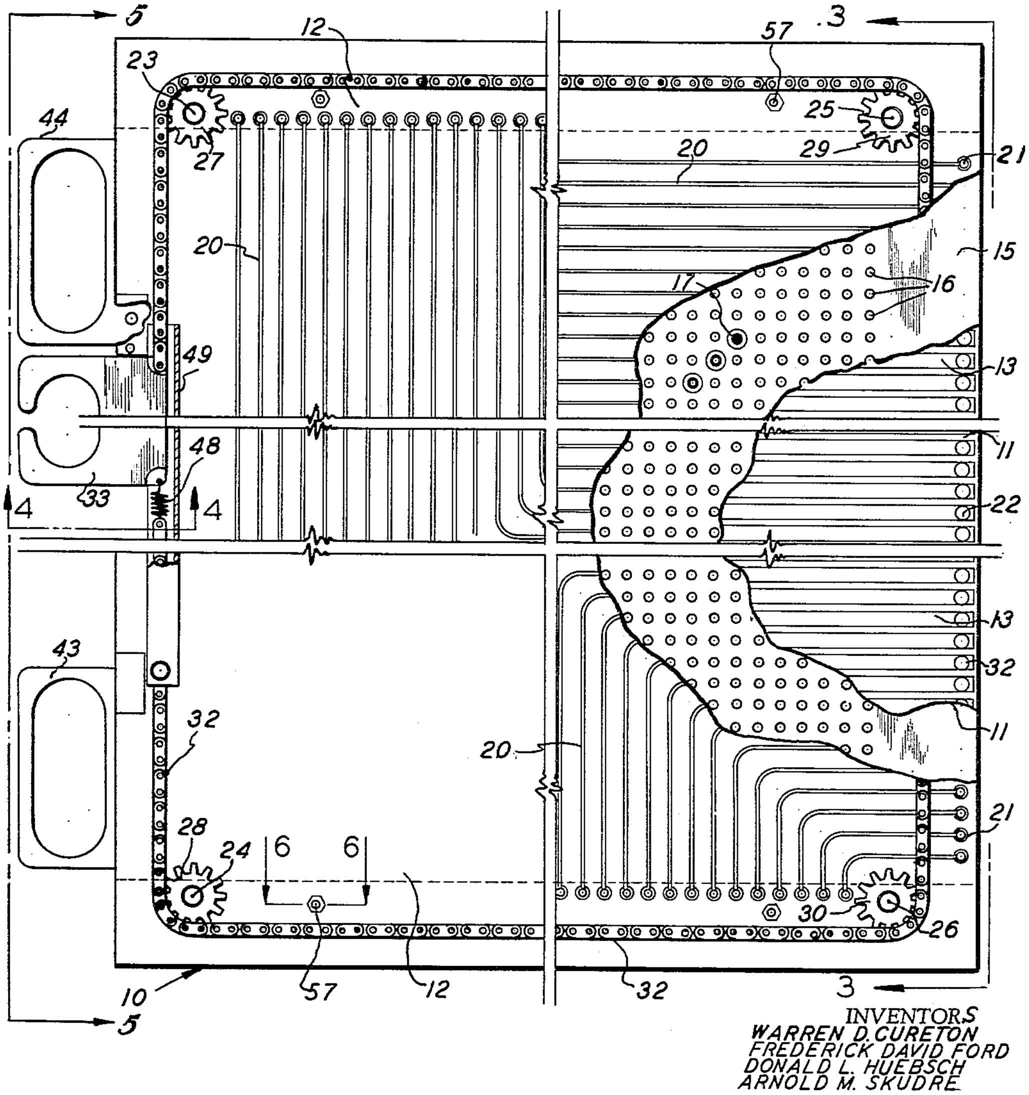
FIG. 2 is a side elevation of a connecting circuit unit, partially broken away to expose certain portions of the apparatus, taken along the line 2—2 in FIG. 1.
Figure 3:
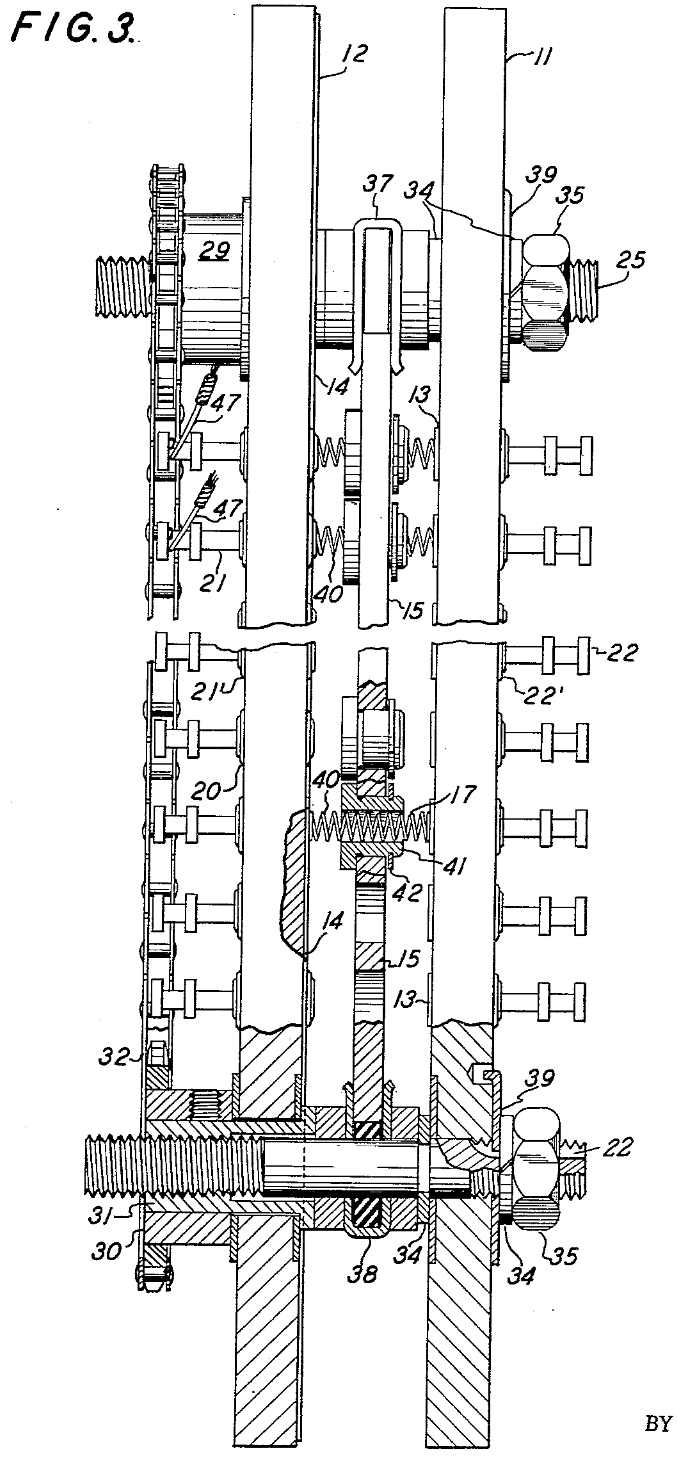
FIG. 3 is an end elevation of the connector circuit unit taken along line 3—3 of FIG. 2, a portion of which has been broken away to show portions of the apparatus.

Each of the connecting units comprises a grid panel 11, which may be called the input panel, and a grid panel 12, which may be called the output panel. The input panel is provided with a plurality of grid conductors 13 which are preferably disposed parallel to one another and which may extend either along a horizontal or along a vertical direction. These grid conductors are arbitrarily shown running in a horizontal direction along the right side of the card 11 in FIG. 1. A portion of these conductors can be seen through the broken out portion in the back side of FIG. 2. The output panel is provided with a plurality of grid conductors 14 which preferably extend along a direction which is at right angles to the direction of the grid conductors of the corresponding input panel. Accordingly these grid conductors are arranged in a vertical direction, and they lie on the left side of the grid panel 12 in FIG. 1. One of these conductors can be seen on the right side of the panel in FIG. 3. A programming panel 15 is located between the input and output panels. This panel is shown in FIGS. 1 and 3, and a portion of it is shown in FIG. 2. The programming panel is provided with openings 16, shown in greater detail in FIG. 2, located at the projucted crosspoints of the grids 13 and 14 on the programming panel. Connectors 17 are located in selected openings in the programming panel, and they extend between the corresponding grids on the input and output panels to interconnect them.

The input and output panels may be connected to cables, such as the cables 18 and 19, for connecting the units to other electrical apparatus. The connecting circuit units may be connected in parallel or in series, or they may be employed separately and independent of one another.

In a preferred embodiment of the invention, the terminals 21 and 22, for connecting the input and the output panels to other equipment, are located along corresponding edges of the panels. Conductors 20 on the panel 12 provide connections between the vertical grids 14 and the terminal 21 at the right-hand edge of the panel 12.

FIGS. 2 to 6 show a preferred arrangement for a connector unit, such as the unit 10 of FIG. 1. In FIG. 2, a portion of the panel 12 has been cut away to reveal the programming panel 15 and the openings or bores 16 located at the projected crosspoints of the grids 13 and 14. Connectors 17 are located in selected openings in the programming panel to provide a desired connecting circuit operation.

The mechanical coupling of adjacent panels 11 and 12 may include shafts 23 to 26 which are threaded externally on both ends. The shafts 23 to 26 pass through the grid panels 11 and 12 near the corners thereof and through suitably disposed spacing members separating the grid panels. Sprockets 27 to 30 are secured to sleeves 31 threaded on the shafts and mounted for rotation on the ends of the shafts projecting past the grid panel 12. A portion of the sleeves 31 adjacent the sprockets passes through the grid panel 12 and may be journaled therein for rotation with the sprockets 27 to 30.

A chain belt 32, meshing with the teeth of sprockets 27 to 30, is connected to a handle 33 for simultaneous rotation of the sprockets and uniform lateral displacement of the panel 12. Vertical movement of the handle 33 between sprockets 27 and 28 rotates sprockets 27 to 30 on the threaded portions of the shafts 23 to 26. Since the sprockets are secured to sleeves 31 having flanges extending along the inner surface of the panel 12, the panel moves with the sprockets. Thus, the panel 12 may be moved toward or away from the panel 11 by manipulating the handle 33.

The ends of the shafts 23 to 26 are rigidly affixed to the panel 11 by lock washers 34 and nuts 35. Locking members 39 prevent rotation of the shafts in the panel 11.

U-shaped guides 37 and 38 extend substantially the width of the grid panels 11 and 12. The guide 37 is mounted on shafts 23 and 25 and guide 38 is mounted on shafts 24 and 26.

In a preferred embodiment of the invention, the connectors 17 comprise a resilient coil spring 40, and a spring guide 41 which is secured in place by a split washer 42. The ends of the coil spring 40 engage the selected grid conductors 13 and 14 and interconnect the selected conductors. The spring guide 41 may be formed of insulating material and shaped to prevent transverse displacement of the coil spring 40 relative to the spring axis.

The grid conductors 13 and 14 comprise conductive strips secured to the respective panels horizontally and vertically and in spaced relationship. Grid panels 11 and 12, therefore, may comprise printed circuits, in which a sheet of insulating material is covered with conductive material and processed, such as by etching, to form the grid conductors 13 and 14.

Terminals 21 and 22 include spaced flanges to facilitate connecting leads 46 and 47 to the terminals. Eyelets or rivets 21′ and 22′ along the lateral edges of panels 11 and 12 provide a seat for the terminals 21 and 22 and connect the terminals to respective grid conductors 13 and 14.

Handles 43 and 44 are secured to the programming panel 15 by suitable fastening means extending through lateral edge of the panel, and these handles may be employed to insert or remove the programming panel between the grid panels 11 and 12. The handle 33 for actuating the grid panel 12 is connected directly to chain belt 32 on one side and by a coil spring 48 on the opposite side. The handle 33 travels in a channel or guide member 49 which is secured to grid panel 12.

Figures 4, 5, 6:
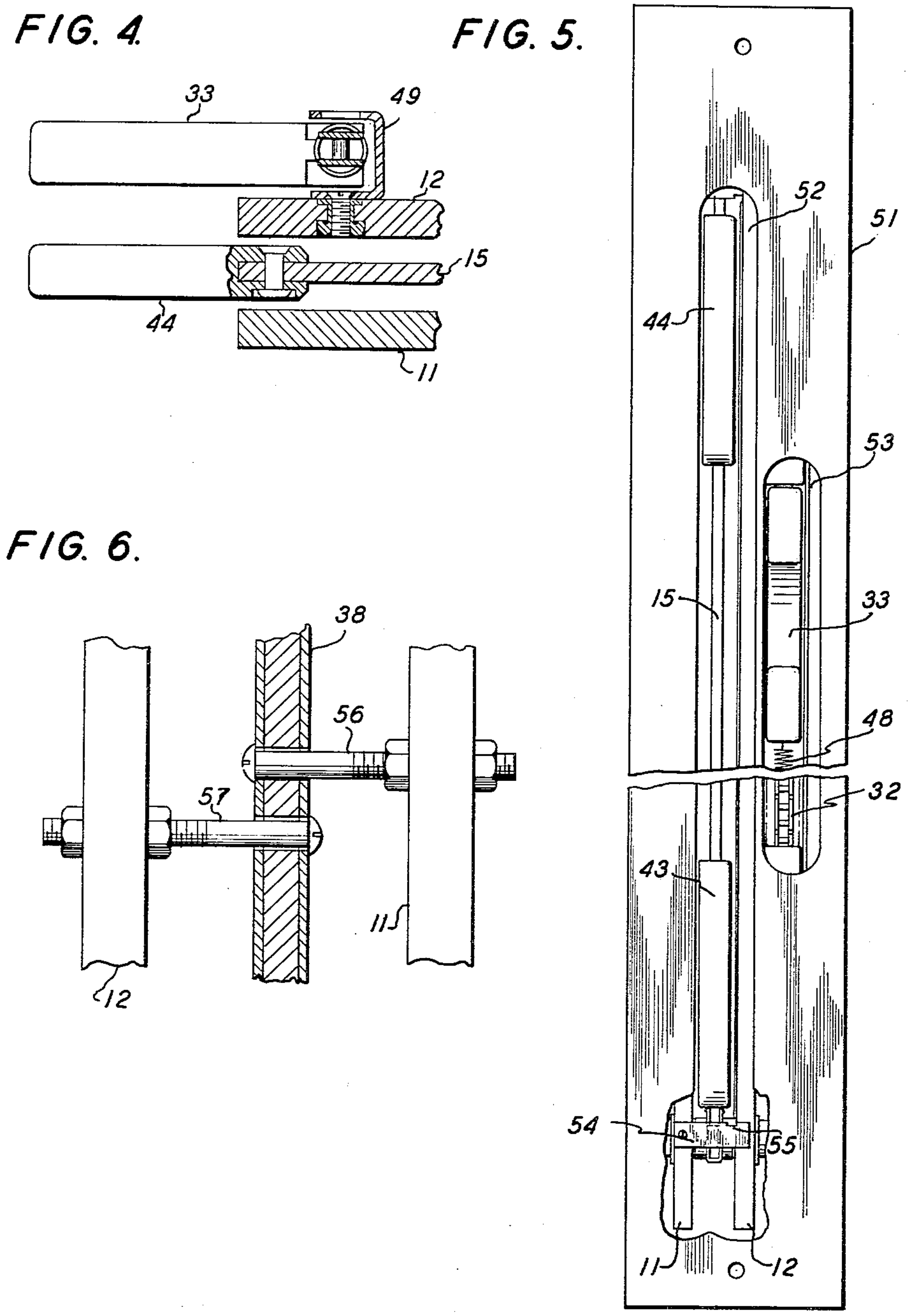
FIG. 4 is a detailed view of the connecting circuit panels taken along line 4—4 of FIG. 2.
FIG. 5 shows an end enclosure panel mounted on the connector circuit unit, taken along the line 5—5 in FIG. 2.
FIG. 6 is a detailed view of alignment apparatus for the programming panel guides taken along line 6—6 of FIG. 2.

A connecting network consisting of a number of connecting circuit units 10 may be mounted side by side and enclosed as shown in FIG. 5 by an end enclosure panel 51. An elongated opening 52 is provided to permit insertion and removal of the programming panel 15 and the lateral movement of handles 43 and 44. Opening 53 is adjacent the chain belt 32 to permit vertical movement of handle 33 projecting outside of the enclosure 51.

The panel 15 may be locked in position by a detent bar 54. The detent bar is notched at 55 to permit the lower edge of the programming panel to pass the detent bar in removing the panel from the unit. The locking arrangement prevents removal of panel 14 prior to alignment with notch 55 and lateral displacement of panel 12. This feature prevents unnecessary wear on the grid conductors due to sliding engagement with springs 40 during movement of the panel 15 and assures horizontal positioning of the panel in the unit 10.

Alignment of panel 15 with notch 55, upon maximum lateral displacement of panel 12, is provided by bolts 56 and 57 secured to panels 11 and 12 respectively, and passing through programming panel guides 37 and 38. In FIG. 6, a horizontal cross-section illustrates panels 11 and 12 in the position of maximum lateral displacement for insertion and removal of panel 15 in guide 38. Along with other parameters, the maximum spacing is determined by the section of the bolt between the respective grid panels and programming panel wherein the heads of the bolts 56 and 57 bear against opposite sides of the programming panel guide 38. The centering arrangements may be located adjacent the vertical edges of the programing panel 15 in the top and bottom guides 37 and 38, as indicated in FIG. 2 by bolts 57 extending through panel 12. However, the centering arrangement is only required adjacent the detent bar 54 for alignment of the adjacent edge of the programming panel with slot 55.

In operation, an input line from an associated functional unit is connected to one or more conductors 13 of an input grid panel 11. The grid conductors 13 are connected to one or more conductors 14 of the output grid panel 12 by selectively positioning connectors 17 in the programming panel 15. The conductors 14 of the output grid are, in turn, coupled to functional units by output leads forming the cable 19. As shown in FIG. 1, the input grids may include either horizontal grid conductors as employed in unit 10 or vertical grid conductors as shown in units 10A and 10B. Cross-points projected on the programming panel result from a pair of adjacent grids in which the grid conductors of one panel are horizontal and the grid conductors on the other panel are vertical. This arrangement provides for the simplest connector unit although it is permissible to arrange the grid conductors in any pattern desired to perform the connecting circuit function desired.

The programming operation or selection of interconnecting paths for information supplied from the functional units requires opening of panels 11 and 12 and preferably the removal of the programming panel 15 from the connector unit 10 and for insertion of the connectors in selected openings 16 in the panel 15. Return of the programming panel 15 to its position in the connector unit 10 establishes the connection between the input grid and the output grid at selected crosspoints for the desired coupling of information. In order to bias the connectors into positive engagement with the grid conductors of the respective grid panels and to facilitate removal of the programming panel 15 from the connector unit 10, the adjustable coupling arrangement provides accurate lateral displacement of grid panel 12 relative to panel 11.

To open the grid panels, handle 33 is moved downwardly, causing the chain belt 32 to move counterclockwise as shown in FIG. 2. As the grid panels are opened, springs 40 disengage respective grid conductors and the centering arrangement, shown in FIG. 6, positions the programming panel in alignment with slot 55 of the detent 54. Upon alignment, panel 15 is readily withdrawn from the unit 10 by handles 43 and 44 through opening 52 in the end enclosure panel 51.

The programming panel 15 may be positioned in the connector unit 10 by guiding the panel top and bottom edges in channels 37 and 38 until the opposite edge of the panel 15 abuts a stop or other suitable positioning means. After the programming panel 15 is reinserted between panels 11 and 12, panel 12 may be laterally displaced to return it to operative position engaging springs 40 of connectors 18 by movement of the handle 33 upwardly as shown in FIG. 2. Upward movement of the handle rotates the chain clockwise, returning the sprockets and the panels 12 and 15 into operative relation. Coil springs 48, coupling the lower corner of the handle 33 to the chain belt 32, prevents overtravel of the panel 12 and undue force being exerted on the panels or spacers between grid panels.

Figure 7:
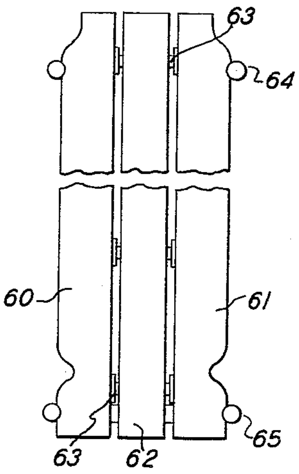
FIG. 7 illustrates an alternate embodiment of the connector circuit unit.

An alternate embodiment is shown in FIG. 7 in which the connecting circuit unit includes grid panels 60 and 61 disposed in spaced relationship on either side of programming panel 62. Grid panels 60 and 61 support vertical and horizontal conductors forming individual grids having projected crosspoints between the panels or in the programming panel 62.

Suitable openings are provided in the programming panel 62 for supporting the laterally extending connectors 63 engaging the opposing grid conductors of the respective panels 60 and 61. Preferably, conductors 63 are resilient to provide axial compression and positive engagement with the grid conductors.

Programming panel 62 is removable from the connector unit of FIG. 7 by movement of clamping means 64 and 65 into adjacent recesses in the sides of panels 60 and 61. After the clamps 64 and 65 have been moved into the recesses, the grid panels may be laterally displaced to permit removal of the programming panel 62 and insertion of connectors 63 in selected positions for the desired interconnection of functional units.

Various modifications of the presently preferred embodiment will be apparent from the foregoing disclosure. Some of these modifications include the use of conductors rigidly suspended to form grids rather than conductive strips on panels; rotatable shafts for displacing all or some of the panels synchronously and simultaneously, or other support and coupling apparatus for spacing and positioning panels of a unit; and prearranged program panels for each operation in which the connectors may be permanently mounted at predetermined positions to produce a desired interchange of information for each program panel of a unit or set of panels of a connecting network.

We claim:

1. A connecting network comprising:

(*a*) a plurality of shafts, (*b*) said shafts having an externally threaded first end and a second end;

(*c*) threaded sleeves mounted for rotation on said shafts;

(*d*) a first grid panel board disposed on said sleeves for lateral movement with said sleeves when said sleeves are rotated;

(*e*) a second grid panel board disposed on said second ends of said shafts, (*f*) said grid panels being disposed in opposed relationship to produce a plurality of projected crosspoints of grid conductors between said grid panels;

(*g*) a programming panel disposed between said grid panels, (*h*) said programming panel having a plurality of spaced openings corresponding to said crosspoints;

(*i*) resilient connectors disposed in said openings and extending through said programming panel;

(*j*) means attached to said sleeves for simultaneously rotating said sleeves in a first direction so as to uniformly vary the spacing between said grid panel surfaces to resiliently bias said resilient connectors between said grid panels, (*k*) whereby when said connectors are resiliently biased they engage opposing grid conductors and establish individual interconnecting circuit paths associated with said grid conductors;

(*l*) detent means for preventing removal of said programming panel from between said grid panels when said resilient connectors are in engagement with said grid conductors; and (*m*) means attached to said programming panel for removing said programming panel from between said grid panels when said resilient connectors and said grid conductors are not in engagement.

2. The device as set forth in claim 1 wherein said means (*j*) attached to said sleeves for simultaneously rotating said sleeves comprises:

(*a*) a plurality of sprockets mounted on respective sleeves; and (*b*) a chain belt meshing with the teeth of said sprockets for simultaneously rotating said sprockets and uniformly displacing said first grid panel with respect to said second grid panel.

References Cited in the file of this patent

UNITED STATES PATENTS

| | | |
|---|---|---|
| 1,961,578 | Bowers | June 5, 1934 |
| 1,981,987 | Bryce | Nov. 27, 1934 |
| 2,041,589 | Bowers | May 19, 1936 |
| 2,853,656 | Dowds | Sept. 23, 1958 |
| 2,872,664 | Minot | Feb. 3, 1959 |

OTHER REFERENCES

Radio and TV News, pp. 42 and 180, September 1956.